United States Patent [19]
Castell

[11] 4,008,155
[45] Feb. 15, 1977

[54] APPARATUS FOR DISPOSAL OF EFFLUENTS

[76] Inventor: William Gummer Castell, 47 Victoria St., London, England

[22] Filed: Mar. 20, 1975

[21] Appl. No.: 560,489

Related U.S. Application Data

[63] Continuation of Ser. No. 417,616, Nov. 20, 1973, abandoned.

[30] Foreign Application Priority Data

Nov. 21, 1972 United Kingdom ............ 53732/72
Oct. 26, 1973 United Kingdom ............ 49961/73

[52] U.S. Cl. ............................ 210/242 R; 61/1 F;
210/DIG. 25; 210/513
[51] Int. Cl.² ........................................ E02B 15/04
[58] Field of Search ............ 210/63, 170, 242, 256, 210/513, 532; 61/1 F

[56] References Cited
UNITED STATES PATENTS

| 924,664 | 6/1909 | Imhoff | 210/532 S |
| 3,618,773 | 11/1971 | Jacquet | 210/242 |
| 3,630,400 | 12/1971 | Koning | 210/242 |
| 3,833,122 | 9/1974 | Cook | 210/242 |
| 3,884,807 | 5/1975 | Heddon | 210/242 |

FOREIGN PATENTS OR APPLICATIONS

| 693,910 | 11/1930 | France | 210/532 |
| 816,440 | 7/1959 | United Kingdom | 61/1 |

Primary Examiner—Theodore A. Granger
Attorney, Agent, or Firm—Shapiro and Shapiro

[57] ABSTRACT

This invention relates to the treatment and disposal of effluent, particularly the treatment and disposal of sewage, by apparatus which is floatable in water and able to be located by moorings or otherwise for example at sea wherein sewage can be pumped out to the apparatus, treated and dispersed in the ambient water.

2 Claims, 5 Drawing Figures

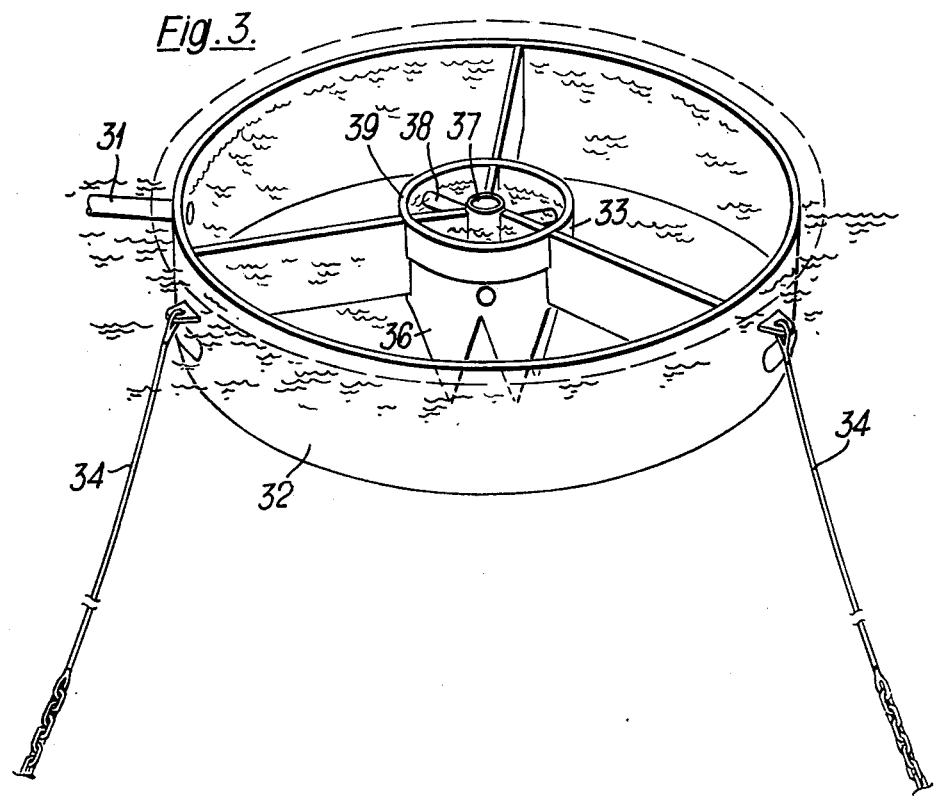
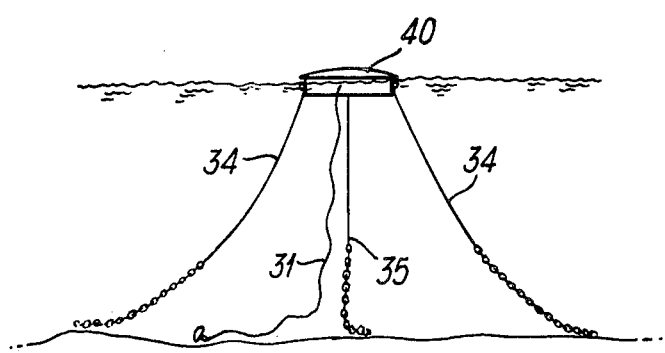

APPARATUS FOR DISPOSAL OF EFFLUENTS

This is a continuation application of Ser. No. 417,616, filed Nov. 20, 1973, now abandoned.

This invention relates to the disposal of effluents especially sewage, at sea on a lake or in esturial or other natural or artificial waters (and for brevity only sea will be referred to). It includes apparatus and a method. Whilst it envisages primarily, treatment by aerobic processing, it may include or be primarily based upon other chemical, biochemical, or photoreactive systems or combinations of such.

The invention may effect disposal either to such an extent that its treated products are tolerable in which case they may be discharged into e.g. the ambient sea to be dispersed by tidal or other currents, or the products may be retained and pumped into containers (e.g. barges, buoyant containers, or pipelines) with safely offshore outlets. In some cases the products having been partially treated (e.g. aerobically with supplemental oxygen or aeration supplied by pumping) may be removed for use or further treatment for example to result in fertilising liquids or solids.

Apparatus according to the invention is flotable in water and able to be moored or otherwise located whilst floating and comprises at least one enclosure of an area of the water which is exposed to atmosphere, in which degradable waste may be broken down, particularly by the activity of bacteria or other biological organisms.

If, and it is preferred that, there be more than one enclosure, these may be constructed either as one vessel or unit or as individual vessels or units linked by means for transporting liquid e.g. pipes or a weir-like formation.

An enclosure may be closed or open at the lower end; the intended purpose, local circumstances or available supporting services, may dictate whether it is closed or open.

The means of transferring material to and from an enclosure may employ gravity displacement or a mechanical means such as pump or air lift.

The invention includes means for any necessary physical or chemical treatment or any combination thereof for preparation of the waste to render it suitable for treatment in the apparatus of the invention. Such preparatory treatment may include the removal or reduction in size of particulate matter, adjustment of the content of materials containing certain chemicals particularly nitrogen and phosphorus, and the removal after segregation or dispersal of oil, fat and grease.

Apparatus according to one aspect of the invention comprises at least two pliable walls preferably of circular cross-section and held concentric, which walls are suspended by buoyancy so as to occupy a certain draught but clear of the sea bed, means for supplying the sewage or the like by pumping into the space defined by one wall, means for treating sewage in such space e.g. by free-fed aeration, ducts or ports whereby the treated product is transferred into the space defined by the second wall, and means for mooring the whole wall structure and its ancillary parts.

Where reference is made herein to sewage, it is to be understood to refer also to other types of outfall or discharged effluent which it is desirable to treat in a submerged condition; and the nature of the treatment may be varied according to the nature of the problem. Thus for example, if the outfall contains chemicals which are broken down by electrolysis, means for causing current-flow may be provided, if practicable by sacrificial electrodes which react in salt water.

Apparatus according to one aspect of the invention comprises two buoyant rings which are held approximately concentric and which may be of inflated sheet plastics or other airtight material, from each of which is suspended a cylindrical wall of sheet plastics (or equivalent) material suitably reinforced against tension if required, each wall having its open-ended lower margin suitably ballasted. The two rings and walls are held e.g. by radial elements in approximate concentricity, and the assembly so afforded is moored with appropriate slack to an anchored submerged mooring-buoy which is within the inner wall. This buoy may support an air supply system whereby air is injected into the inner wall space to aerate the sewage therein. In the inner ring and preferably just below its normal submerged level are one or more flexible ducts, afforded say 100% slack, connecting the inner to the outer ring, and the outlet ends of such ducts can be arranged to be somewhat lower than their inlet ends so as to promote flow of treated sewage from within the inner wall to the annular sectioned space between the walls.

An example of the apparatus according to one aspect of the invention is illustrated by the accompanying drawings, which show FIG. 1 a general diagrammatic view, and FIG. 2 a sectional scrap view of the proposed attachment of a ring and wall and the ballasting of the wall.

FIG. 3 is a schematic view of the apparatus moored on a lake or at sea;

FIG. 4 is a side view of the moored apparatus; and

In these purely exemplary illustrations, there is an inner buoyant ring 1, surrounded by and spaced concentrically from an outer buoyant ring 2. These are proposed to be constructed of plastics material, either of hollow or cellular nature, and reinforced in circumferential tension. Attached to the rings are respectively a cylindrical inner wall 3 and outer wall 4. These are of relatively thin pliable sheet material, for example a woven fabric with impregnated polymer and they are reinforced if necessary by webbing. All plastics joints are preferably heat-bonded.

Figure 1:
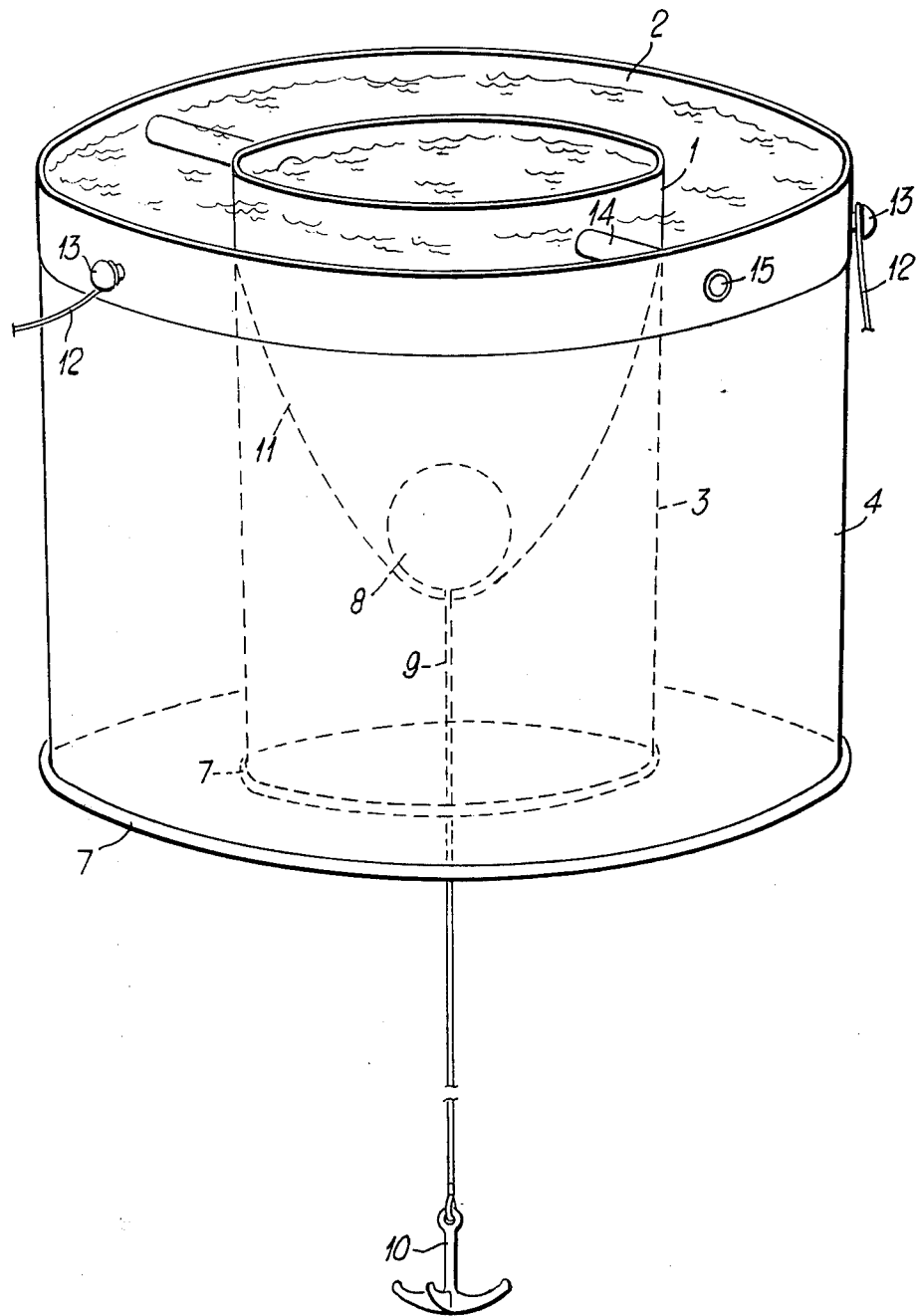
Figure 2:
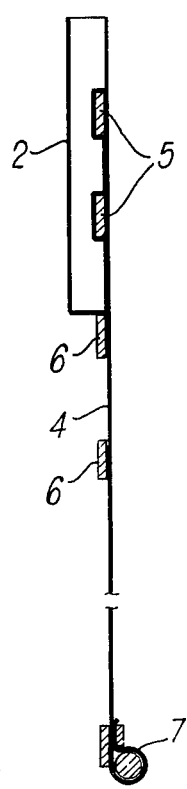
Figure 5:
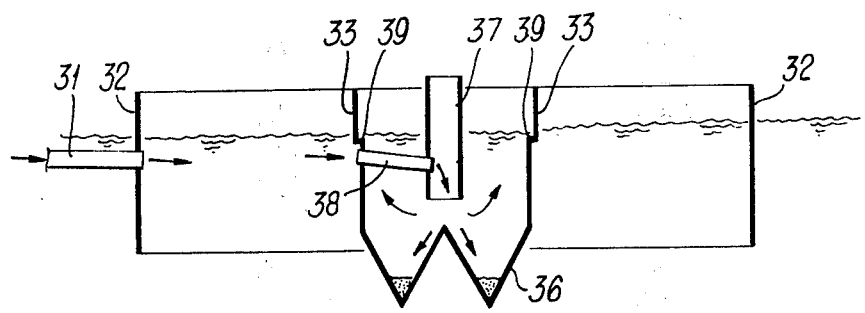
FIG. 5 is a cross-section side view of the apparatus.

The upper margin of each skirt 3, 4, is heat bonded at 5 (see FIG. 2) in grooves or recesses in the respective ring. FIG. 2 also indicates, at 6, how reinforcing rings can be bonded to the skirts 3, 4. The bottom margin of each skirt is provided with ballast; to this end, each has a tubular flexible part 7 bonded to it, and ballast weights are housed in the tubes, or take the form of wire rope or the like.

Within the inner wall 3 and substantially lying in its axis is a buoy 8. This is secured, either by separate cable or by a tube 9, to a suitable vertical-type anchor 10 or other suitable mooring. The cable 9 can have running up it a tube (not shown) which is connected, at sea-bed level, to an outfall sewer pipe (not shown) through which the sewage falls or is pumped from the shore, to rise into the space defined by the wall 3. The buoy 8 is attached by three catenary cables 11 (at 120°) to the inner ring 1.

The outer ring 2 is further secured by three lines 12 (at 120°) to three radially remote moorings (not shown), the edges of which at their inner ends, are secured at 13 to the outer ring 2. Obviously the mooring arrangements are such as to allow for rise and fall of tide. The whole structure is flexible in itself, so that it will yield rather than offer rigid resilience to waves, currents or other disturbances. Pumping, e.g. of air into the inner wall space, may be by hose from the shore (such a hose may be housed within the sewer) or by motor powered by cable from the shore, or by other power source.

The space between the walls into which treated sewage is fed, may store it for removal, or allow it to disperse. To the latter end, perforations either low down or high up (depending on the density of the product of treatment) in the outer wall, may be provided to ensure dispersion.

The space within the inner wall 1 is connected by a flexible duct or preferably, three such ducts 14 at 120°, extending between the inner and outer rings. These ducts may be perforated so as to disperse treated sewage into the space between the walls 1 and 2 from which it can be withdrawn, or they may supply this fluid to an annular perforated ring within the ring 2. Preferably the level of their final outlet is lower than that of their inlet ends, so as to cause an outward flow. The ends of the ducts 14 may take the form of resilient fenders, as at 15, to protect the outer ring 2 against servicing craft.

Preferably however apparatus according to the invention will comprise an aeration enclosure in which waste material in admixture with biological organisms is aerated, and an enclosure for separation of material denser than water from the rest of the waste. The denser material, known as sludge, comprises biological organisms, and when separated and collected may in part be returned to the aeration enclosure, but any surplus may be discharged in the vicinity of the apparatus or conveyed to a more distant point for discharging. The surplus sludge may be reduced in quantity by further aeration in a further enclosure prior to discharge.

Apparatus according to the invention preferably comprises an outer wall and an inner wall, both substantially circular in plan, and arranged to be approximately concentric. The outer enclosure (which is of annular nature) defined thereby constitutes the aeration enclosure and the inner enclosure comprises the separation chamber, which separation chamber is normally closed at the bottom.

A wall of the apparatus can be of any material that allows the apparatus to float or can be adapted to allow the apparatus to float. For example concrete could be used, made buoyant by being hollow or of foam concrete.

An example of a preferred embodiment of the invention will be described with reference to the accompanying drawings.

Sewage for treatment is delivered by a macerating pump to the apparatus via a pipe 31. The sewage is fed or charged through an outer wall 32 into the outer enclosure, defined by the outer wall 32 and an inner wall 33. In this outer enclosure sewage can freely flow.

The outer wall 32 is circular in plan and has three mooring cables 34 attached to locate the apparatus, and an anchor cable 35 is attached to the apparatus. All these cables are such as to allow for the rise and fall of the sea tide.

The pipe 31 is shown on FIG. 4 as lying on the sea bed and snaking up to the apparatus. Snaking is to allow for maximum rise and fall of container.

The outer wall may be of a rigid material such as concrete, or a semi-rigid material or a pliable material e.g. some plastics material, which is ballasted. The amount of freeboard or area exposed above sea level is reduced to a minimum by ballast and moorings adjusted to meet conditions.

The sewage in the outer enclosure is aerated by compressed air, preferably delivered by pipe from the shore, which promotes bacteriological activity for breaking down sewage.

The inner wall 33 is part of an enclosure arranged substantially concentric to the outer wall and attached to it by three 120° spaced arms. This inner enclosure has a closed lower end comprising four 60° cones 36. These are for the collection of sludge and are well shaped for that purpose. Inside and attached to this inner enclosure is a central enclosure 37, arranged substantially concentric to the outer and inner walls, which central enclosure is open at top and bottom, having walls higher than those of the outer and inner walls.

Connecting the outer and aeration enclosure to the central enclosure are downward lying pipes 38, so that material from the outer enclosure flows to the central enclosure. The means attaching the central enclosure to the inner enclosure can form these pipes connecting the outer to the central enclosures.

The central enclosure removes substantially all turbulence from the material flowing into it, i.e. stills the liquid, and imparts to it a downward velocity. The liquid material then flows out of the bottom of the central enclosure. Material denser than water, given a downward velocity, collects in the bottom of the inner enclosure, that is in the cones 36. This is the sludge. The other material, regarded as clarified liquid, flows up around the outside of the central enclosure and is collected by a channel 39.

This channel 39 is around the top of the enclosure wall 33 and directs the liquid into a pipe (not shown) for discharging the liquid into the sea nearby or far away, or into a vessel for later discharging.

The sludge which has accumulated in the cones in the bottom of the inner enclosure is removed e.g. by using a valve which connects the bottom of the cones to a pipe, or preferably by air lift up out of the inner enclosure.

It is preferred that there is a low profile cover 40 over the apparatus, which cover extends beyond the outer wall as shown in FIG. 4. The cover allows free flow of gases to and from the apparatus. It would protect the apparatus from green seas and support navigational warning systems.

It is envisaged that most if not all the mechanical and generating equipment and apparatus will be on land, with cables and pipes carrying power, air and signals leading to the floating apparatus.

These utility lines can be contained in a single pipe which has the sewage pipe and this single pipe can run along the seabed and up the moorings or up the central anchorage 35 to the apparatus. Arranging such a pipe to float, e.g. at sea, might prove dangerous.

Although mechanical means such as pumping or air lift are envisaged for moving waste material, simple apparatus utilising the movement of the sea or the wind might be employed.

I claim:

1. Self-contained completely floating waste material treatment apparatus for use at sea without physical support from land, said apparatus comprising means including a first, annular, enclosure, defined by outer and inner concentric vertical walls circular in plan, for the treatment of waste material therein, a second enclosure defined within said inner wall, means including an open-bottom chamber located centrally in said second enclosure and at least one pipe connecting said first enclosure to said chamber for conveying treated effluent from said first enclosure to said chamber, removing substantially all turbulence from said effluent to still the same, and discharging the stilled effluent to said second enclosure, said enclosures and said chamber being structurally interconnected as a unit, flotation means for floatably supporting said unit upon a body of water, means for loosely anchoring said unit to permit the same to rise and fall with the body of water, and means for supplying waste material to be treated to said first enclosure, at least said second enclosure being closed at the bottom thereof for the accummulaton of material which separates from the treated effluent transferred to said chamber, said bottom of said second enclosure comprising a plurality of tapered chambers arranged side-by-side and defined by walls which diverge upwardly, whereby material denser than water is separated from the rest of the waste.

2. Apparatus in accordance with claim 1, wherein said side-by-side chambers have walls merging centrally of said second enclosure beneath the first-mentioned chamber to divide the effluent from that chamber.

* * * * *